US009251340B2

(12) United States Patent
Cher et al.

(10) Patent No.: US 9,251,340 B2
(45) Date of Patent: *Feb. 2, 2016

(54) MALICIOUS ACTIVITY DETECTION OF A PROCESSING THREAD

(71) Applicant: GLOBALFOUNDRIES INC., Grand Cayman (KY)

(72) Inventors: Chen-Yong Cher, Port Chester, NY (US); Eren Kursun, New York, NY (US); Haifeng Qian, White Plains, NY (US)

(73) Assignee: GLOBALFOUNDRIES INC., Grand Cayman (KY)

(*) Notice: Subject to any disclaimer, the term of this patent is extended or adjusted under 35 U.S.C. 154(b) by 71 days.

This patent is subject to a terminal disclaimer.

(21) Appl. No.: 14/031,401

(22) Filed: Sep. 19, 2013

(65) Prior Publication Data
US 2015/0067852 A1 Mar. 5, 2015

Related U.S. Application Data

(63) Continuation of application No. 14/012,287, filed on Aug. 28, 2013.

(51) Int. Cl.
*G06F 21/55* (2013.01)
*H04L 29/06* (2006.01)

(52) U.S. Cl.
CPC .......... *G06F 21/554* (2013.01); *H04L 63/1416* (2013.01)

(58) Field of Classification Search
None
See application file for complete search history.

(56) References Cited

U.S. PATENT DOCUMENTS

| 5,948,106 A | 9/1999 | Hetherington |
| 6,950,773 B1* | 9/2005 | Gross et al. .................. 702/132 |
| 7,596,464 B2 | 9/2009 | Hermerding et al. |
| 8,037,893 B2 | 10/2011 | Aguilar, Jr. et al. |
| 8,242,793 B2* | 8/2012 | Kumhyr et al. ............ 324/750.3 |
| 8,892,903 B1 | 11/2014 | Trimberger |
| 2003/0149914 A1 | 8/2003 | Kim |
| 2004/0128663 A1* | 7/2004 | Rotem .......................... 717/161 |
| 2005/0275538 A1 | 12/2005 | Kulpa |

(Continued)

OTHER PUBLICATIONS

U.S. Appl. No. 14/012,237.

(Continued)

*Primary Examiner* — Jeffrey Pwu
*Assistant Examiner* — Wasika Nipa
(74) *Attorney, Agent, or Firm* — Thompson Hine LLP

(57) ABSTRACT

A mechanism is provided for detecting malicious activity in a functional unit. For a current activity value associated with a functional unit, a determination is made as to whether a thermal level associated with the functional unit differs from a verified thermal level beyond a first predetermined threshold. Responsive to the thermal level associated with the functional unit differing from the verified thermal level beyond the first predetermined threshold, a determination is made as to whether there is a known profile of thread activity levels that substantially matches current thread activity levels. Responsive to identifying the known profile that substantially matches the current thread activity levels, thread activity levels are compared to the known profile of thread activity levels. Responsive to the thread activity levels differing from the known profile beyond a second predetermined threshold, an indication of suspected abnormal activity associated with the given functional unit is sent.

9 Claims, 6 Drawing Sheets

(56) References Cited

U.S. PATENT DOCUMENTS

| | | |
|---|---|---|
| 2008/0115010 A1 | 5/2008 | Rothman et al. |
| 2010/0332851 A1 | 12/2010 | Priel et al. |
| 2011/0138395 A1 | 6/2011 | Wolfe |
| 2011/0173432 A1 | 7/2011 | Cher et al. |
| 2012/0131673 A1 | 5/2012 | Caci |
| 2012/0310439 A1 | 12/2012 | Lin et al. |
| 2013/0018645 A1 | 1/2013 | Veerse et al. |
| 2013/0031400 A1 | 1/2013 | Liu et al. |
| 2013/0061322 A1 | 3/2013 | Sethumadhavan et al. |
| 2013/0073875 A1 | 3/2013 | Anderson et al. |
| 2013/0157606 A1* | 6/2013 | Chopard et al. .............. 455/307 |
| 2013/0298101 A1 | 11/2013 | Chandra |

OTHER PUBLICATIONS

U.S. Appl. No. 14/031,367.
U.S. Appl. No. 14/012,287.
"Method and Apparatus for DRAM Refresh Management Accounting for Temperature and Traffic Conditions", www.ip.com, IPCOM000226442D, Apr. 3, 2013, 4 pages.
Zhang, Yufu et al., "Statistical Framework for Designing On-Chip Thermal Sensing Infrastructure in Nanoscale Systems", IEEE Transactions on Very Large Scale Integration (VLSI) Systems, vol. PP, Issue 99, Apr. 5, 2013, 10 pages.
Abramovici, Miron, et al., "Integrated Circuit Security—New Threats and Solutions", CSIIRW'09, Oak Ridge, Tennessee, Apr. 13-15, 2009, 3 pages.
Zhou, Huapeng et al., "An Information—theoretic Framework for Optimal Temperature Sensor Allocation and Full-chip Thermal Monitoring", Proceedings of the ACM/IEEE Design Automation Conference (DAC), San Francisco, California, Jun. 3-7, 2012, pp. 642-647.
Pascal, Frederic et al., "Performance Analysis of Covariance Matrix Estimates in Impulsive Noise", IEEE Transactions on Signal Processing, vol. 56, No. 6, Jun. 2008, pp. 2206-2217.
Wei, Sheng et al., "Malicious Circuitry Detection Using Thermal Conditioning", IEEE Transactions on Information Forensics and Security, vol. 6, No. 3, Sep. 2011, pp. 1136-1145.

* cited by examiner

MALICIOUS ACTIVITY DETECTION OF A PROCESSING THREAD

BACKGROUND

The present application relates generally to an improved data processing apparatus and method and more specifically to mechanisms for detecting malicious activity in one or more intellectual property (IP) functional units of an integrated circuit (IC) chip.

Since integrated circuits (ICs) are involved in critical aspects of everyday life, security of ICs is extremely important. For economic reasons, nearly all ICs are fabricated by foreign foundries and include IP functional units supplied by many third-party IP providers. In addition. ICs rely on outsourced design and test services, and use automation tools from many different vendors. Such a design and manufacturing process provides an adversary with many opportunities to insert logic to sabotage an operation of an IC used in critical applications.

An intrusion denotes a hostile modification of an IC that occurs before deployment (during design or manufacturing), providing the basis for an attack that may occur later during the normal operation of the deployed IC. Intrusions may modify the design at different stages, such as RTL (register transfer language), gate-level netlist, or GDSII (Graphic Database System II) layout. Intrusions may target the functional logic or the infrastructure logic inserted in the design to enhance the testability, the reliability, or the manufacturability of the chip. Intrusions such as focused ion-beam (FIB) circuit modifications target an already manufactured chip.

On the other hand, attacks do not require prior intrusions. For example, non-invasive tampering attacks, such as subjecting the chip to radiation or operating the chip outside its specified ranges for voltage, temperature, or frequency, can occur without any circuit modifications.

SUMMARY

In one illustrative embodiment, a method, in a data processing system, is provided for detecting malicious activity in a functional unit of the data processing system. The illustrative embodiment monitors a set of activity values associated with a set of functional units. The illustrative embodiment monitors a set of thermal levels associated with the set of functional units. For a current activity value associated with the functional unit in the set of functional units, the illustrative embodiment determines whether a thermal level associated with the functional unit differs from a verified thermal level beyond a first predetermined threshold. The illustrative embodiment determines whether there is a known profile of thread activity levels that substantially matches current thread activity levels in response to the thermal level associated with the functional unit differing from the verified thermal level beyond the first predetermined threshold. The illustrative embodiment compares thread activity levels to the known profile of thread activity levels in response to identifying the known profile of thread activity levels that substantially matches the current thread activity levels. The illustrative embodiment sends an indication of suspected abnormal activity associated with the given functional unit in response to the thread activity levels differing from the known profile of thread level activities beyond a second predetermined threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, since integrated circuits (ICs) are involved in critical aspects of everyday life, security of ICs is extremely important. Detecting of a security threat may be made both during a design (pre-silicon) as well as during manufacturing testing, silicon validation, and system testing and validation (post-silicon). While pre-silicon detection would be better than post-silicon detection, current IC design may make pre-silicon detection practically impossible. Thus, the illustrative embodiments provide mechanisms for detecting malicious activity in one or more intellectual property (IP) functional units of an IC chip. The mechanisms utilize relationships between the on-chip activity (in the form of activity counters), an amount of heat produced as a result of the on-chip activity (in the form of thermal sensor readings), and/or workload scheduling and allocation (in the form of thread monitoring) in a test environment to create accurate and detailed profiles of a verified IC chip at various macro levels. Then, when a data processing system is put into operation, real-time activity counts, thermal readings, and/or scheduling/co-location of threads are compared to accurate and detailed profiles obtained in the test environment in order to identify anomalous behaviors and/or unidentified IP functional units.

Figure 1:
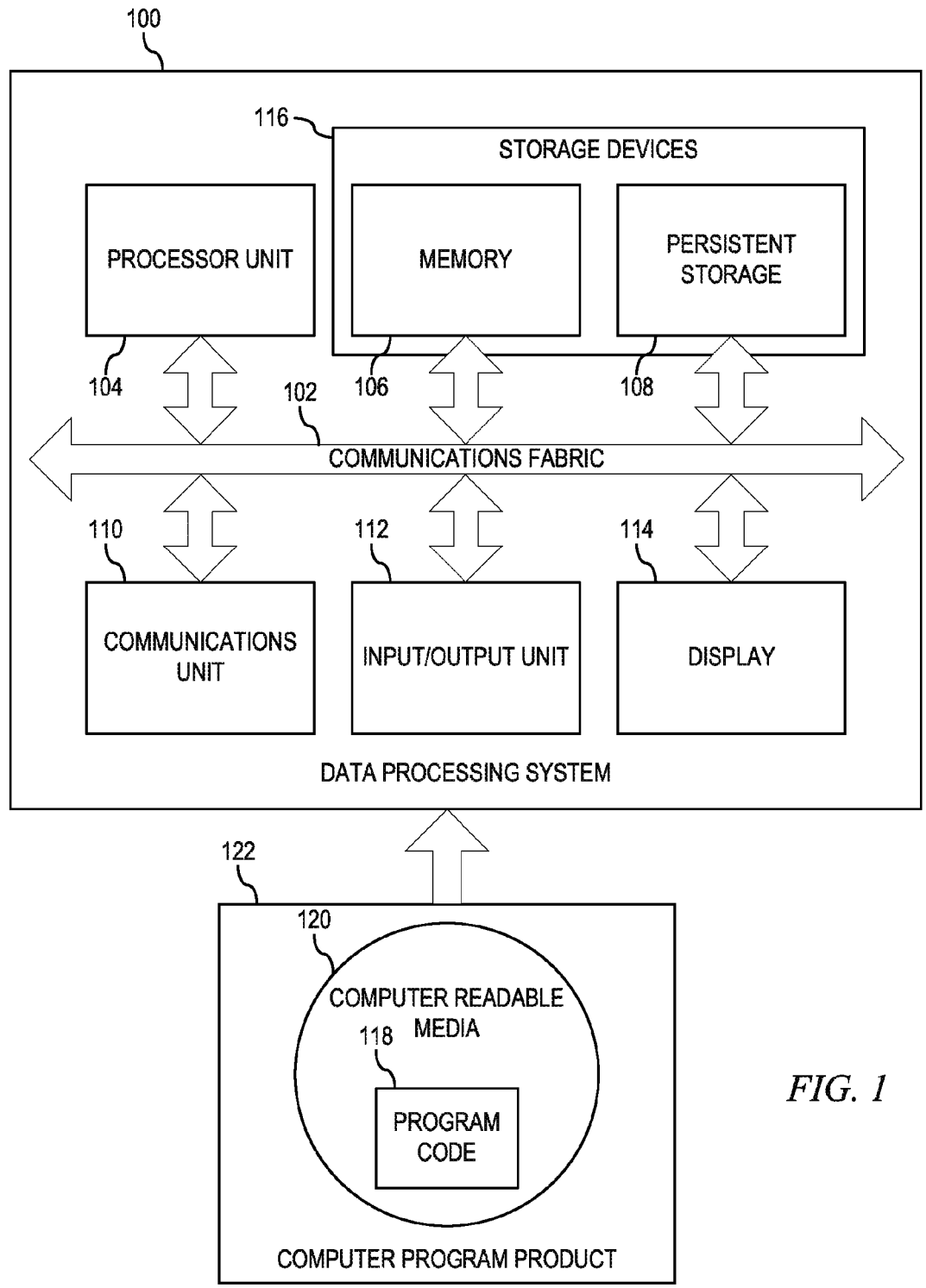
FIG. 1 depicts a block diagram of a data processing system in which illustrative embodiments may be implemented.
Figure 2:
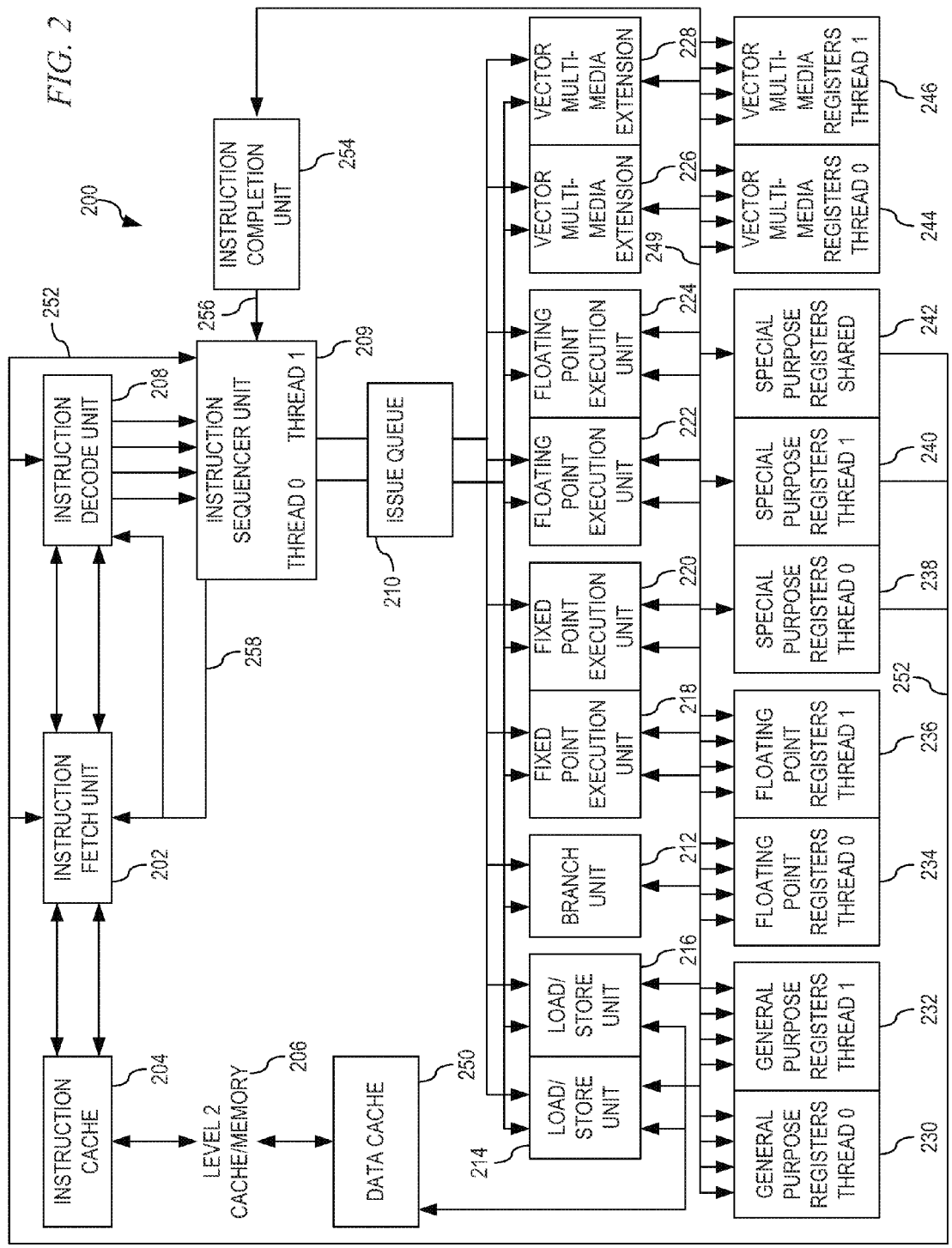
FIG. 2 depicts an exemplary block diagram of a conventional dual threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of using power proxies combined with on-chip actuators to meet a defined power target, this is only an example and is not intended to state or imply any limitation with regard to the features of the present invention. To the contrary, the illustrative embodiments are intended to include distributed data processing environments and embodiments in which power proxies combined with on-chip actuators may be used to meet a defined power target.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form. In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with dual-thread simultaneous multi-threading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions. FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

In order to protect against security threats, such as intrusions and attacks, from a functional unit in an integrated circuit (IC) chip, such as processor 200 of FIG. 2, the illustrative embodiments provide mechanisms for detecting malicious activity in one or more intellectual property (IP) functional units of an IC chip using accurate and detailed profiles of a verified IC chip at various macro levels. Then, when a data processing system is put into operation, real-time activity counts, thermal readings, and/or scheduling/co-location of threads are compared to accurate and detailed profiles obtained in the test environment in order to identify anomalous behaviors and/or unidentified IP functional units.

Figure 3:
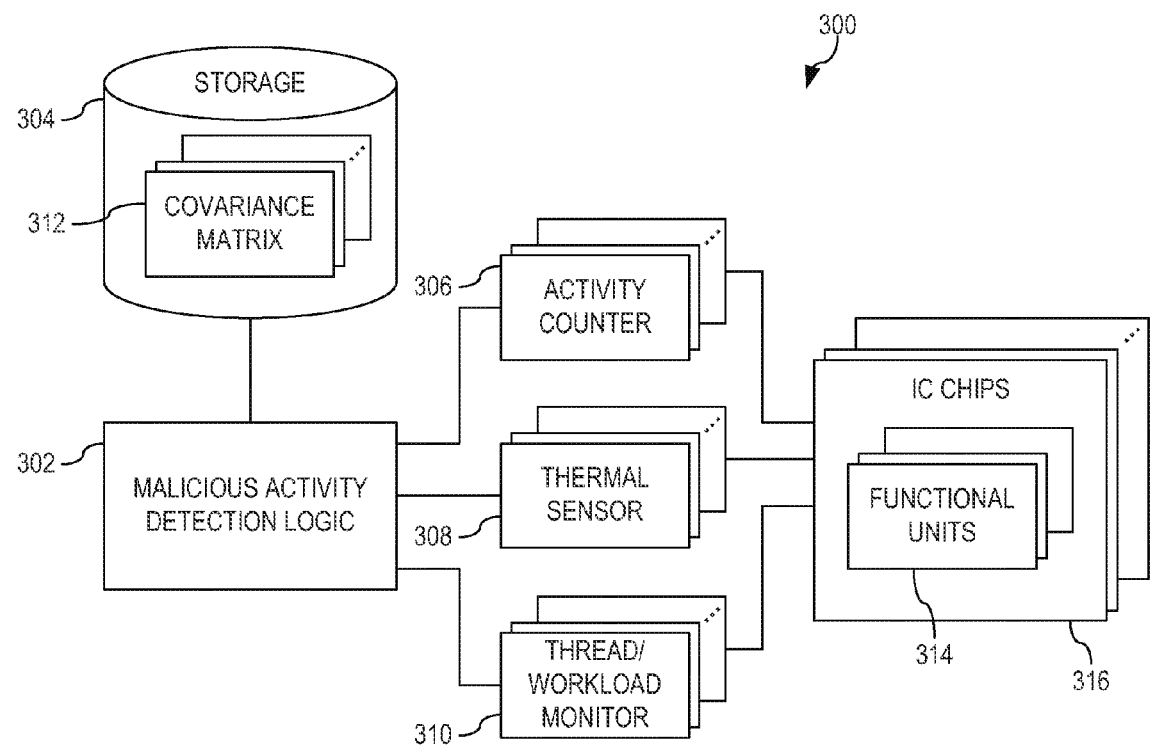
FIG. 3 depicts an exemplary illustration of the implementation of a malicious activity detection mechanism in a data processing system in accordance with an illustrative embodiment.

FIG. 3 depicts an exemplary illustration of the implementation of a malicious activity detection mechanism in a data processing system in accordance with an illustrative embodiment. Data processing system 300 comprises malicious activity detection logic 302, storage 304, set of activity counters 306, set of thermal sensors 308, and set of thread/workload monitors 310. Data processing system 300 also comprises one or more covariance matrices 312 within storage 304. Covariance matrices 312 comprise known operation profiles for each of a set of functional units 314 of a set of integrated circuit (IC) chips 316 within data processing system 300. That is, for each functional unit 314 that is to be monitored by malicious activity detection logic 302, there is covariance matrix 312 for that functional unit based on differing levels of activities being processed by functional unit 314, the thermal characteristics associated with functional unit 314 at the each of the differing levels of activities, as well as a mapping of the thread activities by the one or more processors within data processing system 300 during the execution of the differing levels of activities.

Covariance matrices 312 may be either obtained or generated. That is, during testing of and before data processing system 300 is put into production by a customer, each of functional units 314 within data processing system 300 may be tested at the differing levels of activities, which in turn is used to generate the functional unit's associated covariance matrix 312. However, rather than putting each data processing system through such testing in order to generate data processing system specific covariance matrices 312, covariance matrices 312 may be retrieved from a company that produced data processing system 300 that may provide known verified covariance matrices 312 for each of the functional units 314 that are installed into data processing system 300.

Once data processing system is put into service, in one embodiment, malicious activity detection logic 302 begins monitoring of the operation of functional units 314. That is, malicious activity detection logic 302 proceeds to work either synchronously or asynchronously with activity counters 306 associated with functional units 314 in order to track activity levels associated with the functional units 314, which may be indicated by detailed activity levels, patterns of activity, regions of activity, and corresponding criticality levels. In order to track the detailed activity levels, patterns of activity, regions of activity, and corresponding criticality levels of the operations, activity counters 306 may be hardware counters, sensor data, or the like, associated with each of the functional units 314 in IC chips 316. Similarly, malicious activity detection logic 302 proceeds to work either synchronously or asynchronously with thermal sensors 308 associated with functional units 314 in order to track thermal levels associated with each of the functional units 314.

Knowing the physical relationship between each of activity counters 306, thermal sensors 308, and functional units 314, malicious activity detection logic 302 builds a statistical model of expected relationships among activity counters 306 and thermal sensors 308 associated with each of functional units 314 in order to detect anomalies. That is, for a given functional unit 314, malicious activity detection logic 302 is able to determine for a current activity counter values identified by activity counters 306 whether the current thermal values from thermal sensors 308 indicates a probability of an abnormal event occurring within the given functional unit 314. Malicious activity detection logic 302 performs this determination by identifying an entry associated with the current activity counter values from activity counters 306 associated with the given functional unit 314 in a covariance matrix 312 associated with the given functional unit 314. Once the entry is identified, malicious activity detection logic 302 identifies the associated thermal values from the covariance matrix 312 and compares this to the current thermal values from thermal sensors 308 associated with the given functional unit 314. If malicious activity detection logic 302 determines that the current thermal values differ, high or low, beyond some predetermined threshold, then malicious activity detection logic 302 sends an indicator to an administrator that suspected abnormal activity has been detected associated with the given functional unit 314.

The illustrative embodiments recognize that there are many possible choices for the statistical model that describes the joint distribution of thermal sensors 308 and activity counters 306. The following is just one example of a statistical model to identify an abnormal behavior of a given functional unit 314 based on the activity levels detected by one or more activity counters 306 and one or more thermal sensors 308 associated with the given functional unit 314.

For the given functional unit 314, at any given time, malicious activity detection logic 302 sets associated activity counter values from activity counters 306 and associated thermal values from thermal sensors 308 to $X_1, X_2, \ldots, X_n$. Each of these variables is a single number. The temperature values and activity counter values may be in different units and value ranges. The given functional unit 314 stores the expected activity counter value $E[Xi]$, $i=1, 2, \ldots, n$, for all n activity counters 306 and thermal sensors 308 associated with the given functional unit 314. The given functional unit 314 also stores the covariance value $E[(Xi-E[Xi])*(Xj-E[Xj])]$ for any i, j combination, where i represents activity counters 306 associated with the given functional unit 314 and j represents the thermal sensors 308 associated with the given functional unit 314.

Based on the above stored information in the given functional unit 314, and based on the current readings $X_1=x_1$, $X_2=x_2, \ldots, X_n=x_n$, malicious activity detection logic 302 determines a conditional distribution $Y=Xj|AND(Xi=xi$, for $i!=j)$, which is a Gaussian distribution. That is, $Xj|AND(Xi=xi, i!=j)$ is a random variable which is the conditional distribution of thermal sensors $Xj$ under the condition that all other current thermal sensor and counter readings are given by the numbers x1, x2, . . . xn except for Xj. Utilizing the conditional distribution Y, malicious activity detection logic 302 then determines a probability metric P that the event being detected is an actual abnormal event using the following function:

$$P=|Y-E[Y]|>|xj-E[Y]|$$

where $E[Y]$ is an expected probability and xj is the thermal sensor near where the abnormality is occurring. If the probability metric P indicates that an abnormal event is occurring near the thermal sensor $Xj_n$, then malicious activity detection logic 302 sends an indicator to an administrator that suspected abnormal activity has been detected associated with the given functional unit 314.

Thus, using the above example or any other statistical model to identify an abnormal behavior of a given functional unit 314, once an abnormal event is detected by comparing current readings from thermal sensors 308 and activity counters 306 to known thermal values and activity counter values stored in covariance matrices 312, malicious activity detection logic 302 identifies the given functional unit 314 to an administrator.

In an additional embodiment, in addition to tracking the activity levels associated with the functional units 314 via activity counters 306 and thermal levels associated with each of the functional units 314 via thermal sensors 308, malicious activity detection logic 302 also monitors workload via thread/workload monitors 310. As described previously, for a given functional unit 314, malicious activity detection logic 302 is able to determine for a current activity counter values identified by activity counters 306 whether the current thermal values from thermal sensors 308 indicates a probability of an abnormal event occurring within the given functional unit 314. Additionally, based on the current activity counter values and the current thermal values, once the probability of an abnormal event occurring is identified, malicious activity detection logic 302 may also use thread activities associated with the given functional unit 314 stored in the covariance matrix 312 associated with the given functional unit 314 to identify one or more threads that are acting in an abnormal fashion and thereby an application that is causing the abnormal event.

In detail, covariance matrix 312 associated with the given functional unit 314 also stores verified thread activity levels or profiles for applications that use the given functional unit 314. Each profile for each application indicates a temporal nature (sometimes known as phases) of the application. That is, for example, each workload associated with an application has a recognizable starting stage A, a recognizable ending stage N, one or more recognizable middle stages B, C, and so on. During execution, the workload tends to bounce back and forth between different middle stages B, C, . . . , although, monitoring identifies that the application tends to stay in stage B on average for 2 thermal-sensor-read cycles, and tends to stay in C for 3 on average, and so on. Further, monitoring identifies that the application may bounce between the stages and average number of iterations, such as 3.

Therefore, once malicious activity detection logic 302 determines for current activity counter values identified by activity counters 306 whether the current thermal values from thermal sensors 308 indicates a probability of an abnormal event occurring within the given functional unit 314, malicious activity detection logic 302 may use currently detected thread activity levels from thread/workload monitors 310 to quickly identify a suspect application based on the exhibited thread activity captured by thread/workload monitors 310. An abnormally acting application that has been compromised may intentionally and frequently migrate workload between threads in an attempt to bypass security and consistency checks.

Thus, malicious activity detection logic 302 performs an identification of one or more maliciously acting threads by comparing the current detected thread activity levels from thread/workload monitors 310 to profiles of thread activity levels in covariance matrix 312. If malicious activity detection logic 302 determines that the current detected thread activity levels fails to differ beyond some predetermined threshold of a known profile, then malicious activity detection logic 302 does not take action and continues to monitor activity. However, if malicious activity detection logic 302 determines that the current detected thread activity levels differ beyond some predetermined threshold of a known profile, then malicious activity detection logic 302 sends an indicator to an administrator that suspected abnormal activity has been detected associated with the given functional unit 314. Further, malicious activity detection logic 302 may also inspect the packets associated with the current detected thread activity levels in order to identify the application that is performing the suspected abnormal activity, which malicious activity detection logic 302 may also send to the administrator.

If the there is no known profile with which to compare the current detected thread activity levels, then malicious activity detection logic 302 sends an indicator to an administrator that suspected abnormal activity has been detected associated with the given functional unit 314. Based on this indicator as well as any other indicators described previously, the administrator may identify that the suspected abnormal activity is either actual abnormal activity or a new application for which a profile has not been added to covariance matrix 312. In the latter case, malicious activity detection logic 302 may be placed into a training period, in which, malicious activity detection logic 302 builds a new profile for the current detected thread activity levels and the current thermal values for the given functional unit 314 in covariance matrix 312.

Further, if malicious activity detection logic 302 determines, using values identified by activity counters 306 and values from thermal sensors 308, a probability of an abnormal event occurring within the given functional unit 314 where two or more threads are accessing the given functional unit 314, malicious activity detection logic 302 separates the threads and pairs them with other threads on a same or different core. If one of the threads that were separated continues to exhibit an unrecognized thermal profile, malicious activity detection logic 302 sends an indicator to an administrator that suspected abnormal activity has been detected associated with the given functional unit 314 and the identified thread.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™ Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
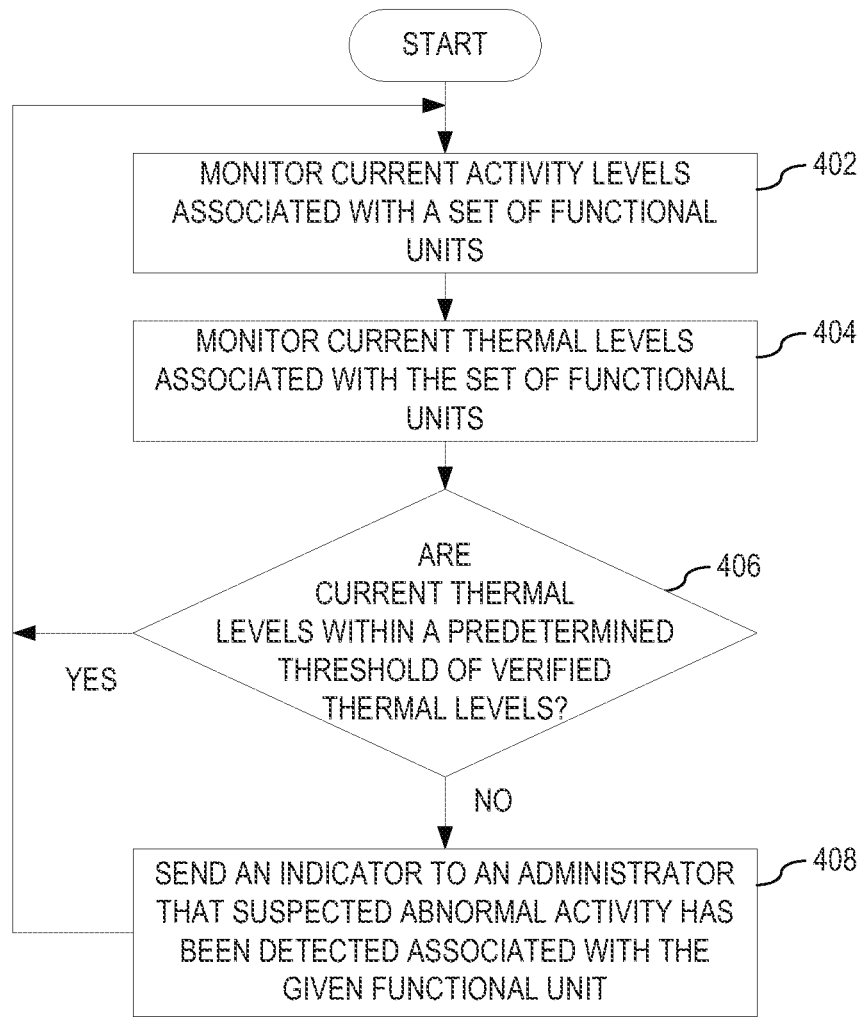
FIG. 4 depicts a functional block diagram of an operation performed by a malicious activity detection mechanism using activity levels and thermal levels in accordance with an illustrative embodiment.

FIG. 4 depicts a functional block diagram of an operation performed by a malicious activity detection mechanism using activity levels and thermal levels in accordance with an illustrative embodiment. As the operation begins, the malicious activity detection mechanism monitors current activity levels associated with a set of functional units (step 402) as well as current thermal levels associated with the set of functional units (step 404) at predetermined intervals. At the end of each predetermined interval, for each functional unit in the set of functional units, the malicious activity detection mechanism determines, for the current activity counter values identified by an associated set of activity counters, whether the current thermal levels identified by an associated set of thermal sensors differ, high or low, beyond some predetermined threshold of a verified thermal level (step 406). The verified thermal is identified via a covariance matrix associated with the given functional unit. If at step 406 the current thermal levels are within the predetermined threshold, the operation returns to step 402. If at step 406 the current thermal levels fails to be within the predetermined threshold, the malicious activity detection mechanism sends an indicator to an administrator that suspected abnormal activity has been detected associated with the given functional unit (step 408), with the operation returning to step 402 thereafter.

Figure 5:
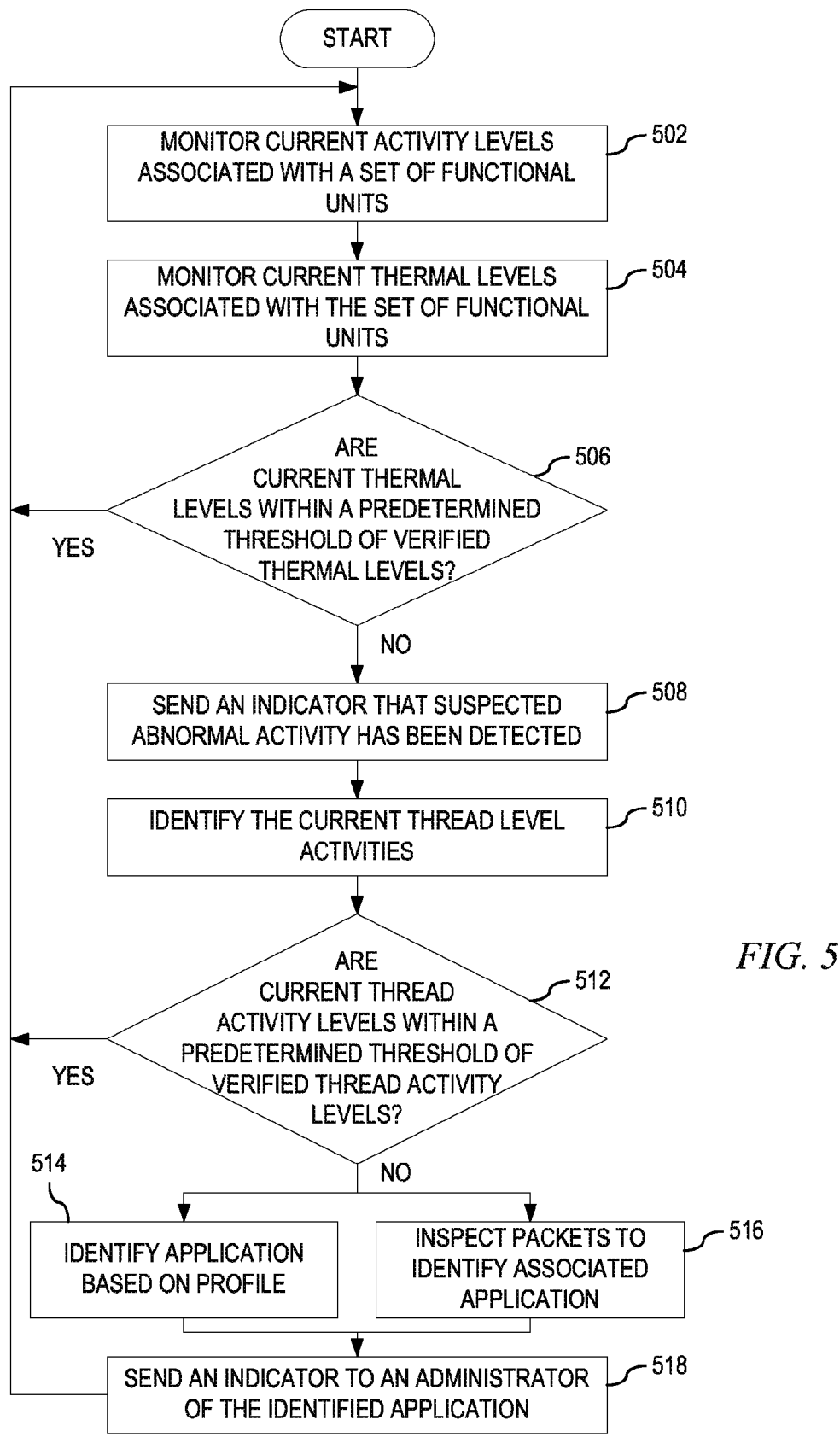
FIG. 5 depicts a functional block diagram of an operation performed by a malicious activity detection mechanism using activity levels, thermal levels, and thread activity levels in accordance with an illustrative embodiment.

FIG. 5 depicts a functional block diagram of an operation performed by a malicious activity detection mechanism using activity levels, thermal levels, and thread activity levels in accordance with an illustrative embodiment. As the operation begins, the malicious activity detection mechanism monitors current activity levels associated with a set of functional units (step 502) and current thermal levels associated with the set of functional units (step 504) at predetermined intervals. At the end of each predetermined interval, for each functional unit in the set of functional units, the malicious activity detection mechanism determines, for the current activity counter values identified by an associated set of activity counters, whether the current thermal levels identified by an associated set of thermal sensors differ, high or low, beyond some predetermined threshold of a verified thermal level (step 506). The verified thermal is identified via a covariance matrix associated with the given functional unit. If at step 506 the current thermal levels are within the predetermined threshold, the operation returns to step 502. If at step 506 the current thermal levels fail to be within the predetermined threshold, the malicious activity detection mechanism sends an indicator to an administrator that suspected abnormal activity has been detected associated with the given functional unit (step 508).

From step 508, the malicious activity detection mechanism identifies the current thread level activities by an associated set of thread workload monitors (step 510). The malicious activity detection mechanism compares the current thread level activities to profiles of thread activity levels in the covariance matrix (step 512). If at step 512 the malicious activity detection mechanism determines that the current detected thread activity levels fail to differ beyond some predetermined threshold of a known profile, then the operation returns to step 502. That is, malicious activity detection mechanism cannot specifically identify any thread that is acting maliciously. However, if at step 512 the malicious activity detection mechanism determines that the current detected thread activity levels differ beyond some predetermined threshold of a known profile, then the malicious activity detection mechanism either identifies the associated application based on the known profile and its associated application (step 514) or the malicious activity detection mechanism inspects packets associated with the current detected thread activity levels in order to identify the application that is performing suspected abnormal activity (step 516). Once the malicious activity detection mechanism identifies the associated application, the malicious activity detection mechanism sends an indicator to an administrator of the identified application (step 518), with the operation returning to step 502 thereafter.

Figure 6:
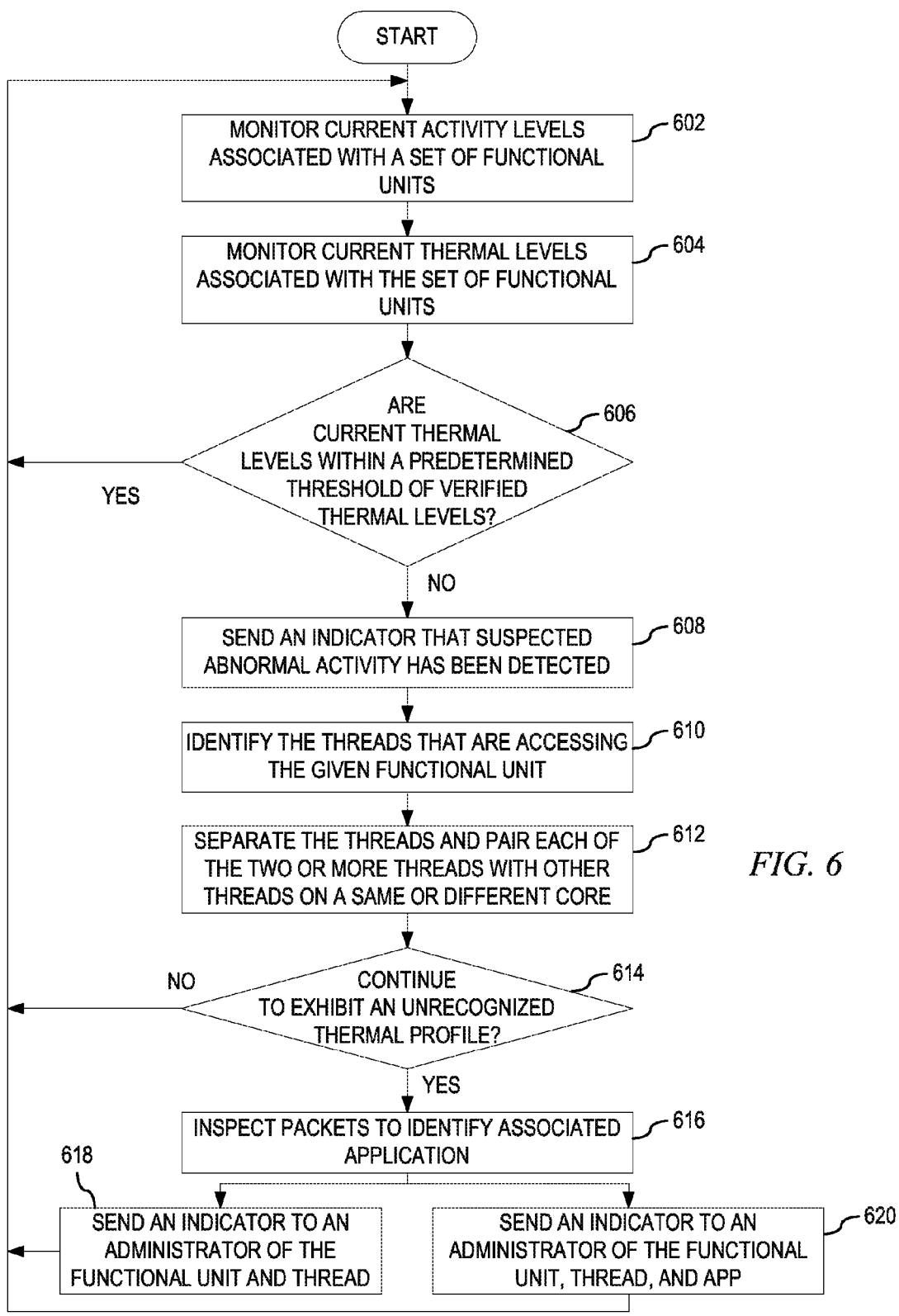
FIG. 6 depicts a functional block diagram of an alternative operation performed by a malicious activity detection mechanism using activity levels, thermal levels, and thread activity levels in accordance with an illustrative embodiment.

FIG. 6 depicts a functional block diagram of an alternative operation performed by a malicious activity detection mechanism using activity levels, thermal levels, and thread activity levels in accordance with an illustrative embodiment. As the operation begins, the malicious activity detection mechanism monitors current activity levels associated with a set of functional units that are being accessed by two or more threads (step 602) and current thermal levels associated with the set of functional units that are being accessed by two or more threads (step 604) at predetermined intervals. At the end of each predetermined interval, for each functional unit that is being accessed by two or more threads in the set of functional units, the malicious activity detection mechanism determines, for the current activity counter values identified by an associated set of activity counters, whether the current thermal levels identified by an associated set of thermal sensors differ, high or low, beyond some predetermined threshold of a verified thermal level (step 606). The verified thermal is identified via a covariance matrix associated with the given functional unit that is being accessed by two or more threads. If at step 606 the current thermal levels are within the predetermined threshold, the operation returns to step 602. If at step 606 the current thermal levels fail to be within the predetermined threshold, the malicious activity detection mechanism sends an indicator to an administrator that suspected abnormal activity has been detected associated with the given functional unit that is being accessed by two or more threads (step 608).

From step 608, the malicious activity detection mechanism identifies the threads that are accessing the given functional unit (step 610). The malicious activity detection mechanism separates the threads and pairs each of the two or more threads with other threads on a same or different core (step 612). The malicious activity detection mechanism then determines whether one or more of the threads that were separated continue to exhibit an unrecognized thermal profile (step 614). If at step 614 one or more of the two or more threads do not continue to exhibit an unrecognized thermal profile, then the operation returns to step 602. If at step 614 one or more of the two or more threads continue to exhibit an unrecognized thermal profile, the malicious activity detection mechanism inspects packets associated with the current detected thread activity levels in order to identify the application that is performing suspected abnormal activity (step 616). From step 614 the malicious activity detection mechanism may either send an indicator to an administrator that suspected abnormal activity has been detected associated with the given functional unit and the identified thread if the malicious activity detection mechanism is unable to determine the application (step 618) or send an indicator to an administrator that suspected abnormal activity has been detected associated with the given functional unit, the identified thread, and the identified application if the malicious activity detection mechanism is able to determine the application (step 620), with the operation returning to step 602 thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for detecting malicious activity in one or more intellectual property (IP) functional units of an IC chip. The mechanisms utilize relationships between the on-chip activity (in the form of activity counters), an amount of heat produced as a result of the on-chip activity (in the form of thermal sensor readings), and/or workload scheduling and allocation (in the form of thread monitoring) in a test environment to create accurate and detailed profiles of a verified IC chip at various macro levels. Then, when a data processing system is put into operation, real-time activity counts, thermal readings, and/or scheduling/co-location of threads are compared to accurate and detailed profiles obtained in the test environment in order to identify anomalous behaviors and/or unidentified IP functional units.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory for detecting malicious activity in a functional unit of an IC chip of the data processing system, the method comprising:

monitoring, by the processor, a set of activity values associated with a set of functional units;

monitoring, by the processor, a set of thermal levels associated with the set of functional units;

for a current activity value associated with the functional unit in the set of functional units, determine whether a thermal level associated with the functional unit differs from a verified thermal level for the functional unit beyond a first predetermined threshold, wherein the verified thermal level for the functional unit and a known profile of thread activity levels are identified from a covariance matrix that associates activity values of the functional unit with verified thermal levels for the functional unit;

responsive to the thermal level associated with the functional unit differing from the verified thermal level for the functional unit beyond the first predetermined threshold, determine whether there is the known profile of thread activity levels that substantially matches current thread activity levels for the functional unit;

responsive to identifying the known profile of thread activity levels that substantially matches the current thread activity levels for the functional unit, compare thread activity levels for the functional unit to the known profile of thread activity levels; and responsive to the thread activity levels for the functional unit differing from the known profile of thread activity levels beyond a second predetermined threshold, send an indication of suspected malicious activity associated with the given functional unit.

2. The method of claim 1, further comprising:

inspecting by the processor, packets associated with the thread activity levels for the functional unit of an IC chip in order to identify an application performing the suspected malicious activity; and responsive to identifying the application, sending, by the processor, an indication of the application to the administrator.

3. The method of claim 1, further comprising:

responsive to failing to identify the known profile of thread activity levels that substantially matches the current thread activity levels for the functional unit of an IC chip, sending by the processor an indication of suspected malicious activity associated with the given functional unit.

4. The method of claim 1, further comprising:

responsive to failing to identify the known profile of thread activity levels that substantially matches the current thread activity levels for the functional unit of an IC chip, determining, by the processor whether the current thread activity levels for the functional unit should be added as a new profile of thread activity levels; and responsive to an indication that the current thread activity levels for the functional unit should be added as the new profile of thread activity levels, entering, by the processor, a training period in which the current thread activity levels for the functional unit are recorded as the new profile of thread activity levels.

5. The method of claim 1, further comprising:

responsive to the thermal level associated with the functional unit differing from the verified thermal level for the functional unit of an IC chip beyond the first predetermined threshold, determining, by the processor, whether the given functional unit is executing two or more threads;

responsive to identifying that the given functional unit is executing two or more threads, separating by the processor, pairing each of the two or more threads with another thread on the same or different functional unit; and responsive to one or more threads of the two or more threads continuing to exhibit an unrecognized thermal profile, sending by the processor, an indication of suspected malicious activity associated with the one or more threads to an administrator.

6. The method of claim 1, wherein the covariance matrix is generated by testing the functional unit at differing levels of activities and recording each activity value and an associated detected thermal level as the verified thermal level for that activity value.

7. The method of claim 1, wherein the covariance matrix is obtained from a producer of the functional unit and wherein the producer previously tested the functional unit at differing levels of activities and recording each activity value and an associated detected thermal level as the verified thermal level for that activity value.

8. The method of claim 1, wherein the set of activity values associated with the set of functional units is monitored via a set of activity counters.

9. The method of claim 1, wherein the set of thermal levels associated with the set of functional units is monitored via a set of thermal sensors.

* * * * *